(12) United States Patent
Wan et al.

(10) Patent No.: US 10,114,465 B2
(45) Date of Patent: Oct. 30, 2018

(54) VIRTUAL REALITY HEAD-MOUNTED DEVICES HAVING REDUCED NUMBERS OF CAMERAS, AND METHODS OF OPERATING THE SAME

(71) Applicant: GOOGLE INC., Mountain View, CA (US)

(72) Inventors: Chung Chun Wan, San Jose, CA (US); Choon Ping Chng, Los Altos, CA (US)

(73) Assignee: GOOGLE LLC, Mountain View, CA (US)

( * ) Notice: Subject to any disclaimer, the term of this patent is extended or adjusted under 35 U.S.C. 154(b) by 227 days.

(21) Appl. No.: 14/996,858

(22) Filed: Jan. 15, 2016

(65) Prior Publication Data
US 2017/0205886 A1 Jul. 20, 2017

(51) Int. Cl.
*G06F 3/01* (2006.01)
*G06T 19/00* (2011.01)
*G02B 27/01* (2006.01)

(52) U.S. Cl.
CPC .......... *G06F 3/017* (2013.01); *G02B 27/0172* (2013.01); *G06T 19/006* (2013.01); *G02B 2027/014* (2013.01); *G02B 2027/0112* (2013.01); *G02B 2027/0138* (2013.01)

(58) Field of Classification Search
CPC ................ G06F 3/017; G02B 27/0172; G02B 2027/0138; G02B 2027/014; G02B 2027/0112; G06T 19/006
See application file for complete search history.

(56) References Cited

U.S. PATENT DOCUMENTS

| 5,889,505 | A | 3/1999 | Toyama et al. | |
|---|---|---|---|---|
| 6,630,915 | B1 | 10/2003 | Flood et al. | |
| 7,274,393 | B2 * | 9/2007 | Acharya | H04N 5/33 250/226 |
| 8,139,142 | B2 * | 3/2012 | Bamji | G01S 17/89 348/335 |

(Continued)

OTHER PUBLICATIONS

International Search Report and Written Opinion received for PCT Patent Application No. PCT/US2016/068045, dated Mar. 20, 2017, 11 pages.

(Continued)

*Primary Examiner* — Antonio Xavier
(74) *Attorney, Agent, or Firm* — Brake Hughes Bellermann LLP

(57) ABSTRACT

Example virtual-reality head-mounted devices having reduced numbers of cameras, and methods of operating the same are disclosed herein. A disclosed example method includes providing a virtual-reality (VR) head-mounted display (V-HMD) having an imaging sensor, the imaging sensor including color-sensing pixels, and infrared (IR) sensing pixels amongst the color-sensing pixels; capturing, using the imaging sensor, an image having a color portion and an IR portion; forming an IR image from at least some of the IR portion from the image; performing a first tracking based on the IR image; forming a color image by replacing the at least some of the removed IR portion with color data determined from the color portion of the image and the location of the removed IR-sensing pixels in the image; and performing a second tracking based on the color image.

20 Claims, 7 Drawing Sheets

(56) References Cited

U.S. PATENT DOCUMENTS

| | | | |
|---|---|---|---|
| 8,885,022 B2 | 11/2014 | Gay et al. | |
| 8,982,261 B2 | 3/2015 | Spears et al. | |
| 9,007,422 B1* | 4/2015 | Kwon | G06T 7/12 |
| | | | 348/14.03 |
| 2003/0063185 A1* | 4/2003 | Bell | G01S 17/023 |
| | | | 348/46 |
| 2012/0218410 A1* | 8/2012 | Kim | G02B 5/201 |
| | | | 348/148 |
| 2012/0320216 A1 | 12/2012 | Mkrtchyan et al. | |
| 2013/0083003 A1 | 4/2013 | Perez et al. | |
| 2013/0293468 A1 | 11/2013 | Perez et al. | |
| 2014/0104274 A1 | 4/2014 | Hilliges et al. | |
| 2014/0176724 A1* | 6/2014 | Zhang | H01L 27/14618 |
| | | | 348/164 |
| 2014/0240492 A1 | 8/2014 | Lee | |
| 2014/0306874 A1* | 10/2014 | Finocchio | G06F 3/017 |
| | | | 345/156 |
| 2015/0054734 A1 | 2/2015 | Raghoebardajal et al. | |
| 2015/0062003 A1* | 3/2015 | Rafii | G06F 3/017 |
| | | | 345/156 |
| 2015/0261299 A1* | 9/2015 | Wajs | G06F 3/011 |
| | | | 726/19 |
| 2016/0181314 A1* | 6/2016 | Wan | H01L 27/14612 |
| | | | 348/302 |
| 2016/0261300 A1* | 9/2016 | Fei | G06T 7/593 |

OTHER PUBLICATIONS

"Vrvana Totem—A premium VR Headset", Vrvana (https://www.vrvana.com/), printed Dec. 15, 2015, 5 pages.

Tang, et al., "High Resolution Photography with an RGB-Infrared Camera", In Proc. 7th Int. Conf. on Computational Photography (ICCP), Houston, TX, IEEE, Apr. 24-26, 2015, pp. 1-10.

\* cited by examiner

400

| B | G | B | G | B | G |
| IR | R | IR | R | IR | R |
| B | G | B | G | B | G |
| IR | R | IR | R | IR | R |
| B 407 | G 406 | B | G | B | G |
| IR 408 | R 405 | IR | R | IR | R |

FIG. 4

VIRTUAL REALITY HEAD-MOUNTED DEVICES HAVING REDUCED NUMBERS OF CAMERAS, AND METHODS OF OPERATING THE SAME

FIELD OF THE DISCLOSURE

This disclosure relates generally to virtual reality, and, more particularly, to virtual-reality head-mounted devices having reduced numbers of cameras, and methods of operating the same.

BACKGROUND

Virtual-reality head-mounted displays have multiple cameras to image and/or render virtual-reality environments in which someone can be physically or virtually present, and to track movements of the viewer and/or other items physically and/or virtually present in the virtual-reality environment.

SUMMARY

Virtual-reality head-mounted devices or displays having reduced numbers of cameras, and methods of operating the same are disclosed. An disclosed example method includes providing a virtual-reality head-mounted display having an imaging sensor, the imaging sensor including color-sensing pixels, and infrared sensing pixels amongst the color-sensing pixels; capturing, using the imaging sensor, an image having a color portion and an infrared portion; forming an infrared image from at least some of the infrared portion from the image; performing a first tracking based on the infrared image; forming a color image by replacing the at least some of the removed infrared portion with color data determined from the color portion of the image and the location of the removed infrared-sensing pixels in the image; and performing a second tracking based on the color image.

A disclosed example virtual-reality head-mounted device for use in a virtual-reality environment includes an imaging sensor to capture an image using color-sensing pixels, and infrared sensing pixels located amongst the color-sensing pixels, the captured image having a color portion and an infrared portion; a reconstructor configured to remove at least some of infrared portion from the image, and form an infrared image from the removed infrared portion; a first tracker configured to perform first virtual-reality tracking within the virtual-reality environment using the infrared image; an image modifier to form a color image by substituting the removed infrared portion with color-sensing pixels determined from the color portion of the image and the locations of the removed infrared-sensing pixels in the image; and a second tracker configured to carry out a second virtual-reality tracking based on the color image.

A disclosed example non-transitory machine-readable media stores machine-readable instructions that, when executed, cause a machine to at least provide a virtual-reality head-mounted display having an imaging sensor, the imaging sensor including color-sensing pixels, and infrared sensing pixels amongst the color-sensing pixels; capture, using the imaging sensor, an image having a color portion and an infrared portion; form an infrared image using at least some of the infrared portion; perform a first tracking based on the infrared image; form a color image by replacing the at least some of the infrared portion of the with color data determined from the color portion of the image and the location of the at least some of the infrared portion in the image; and perform a second tracking based on the color image.

BRIEF DESCRIPTION OF THE DRAWINGS

FIG. 4 is an example imaging sensor in accordance with the teachings of this disclosure.

DETAILED DESCRIPTION

Figure 1:
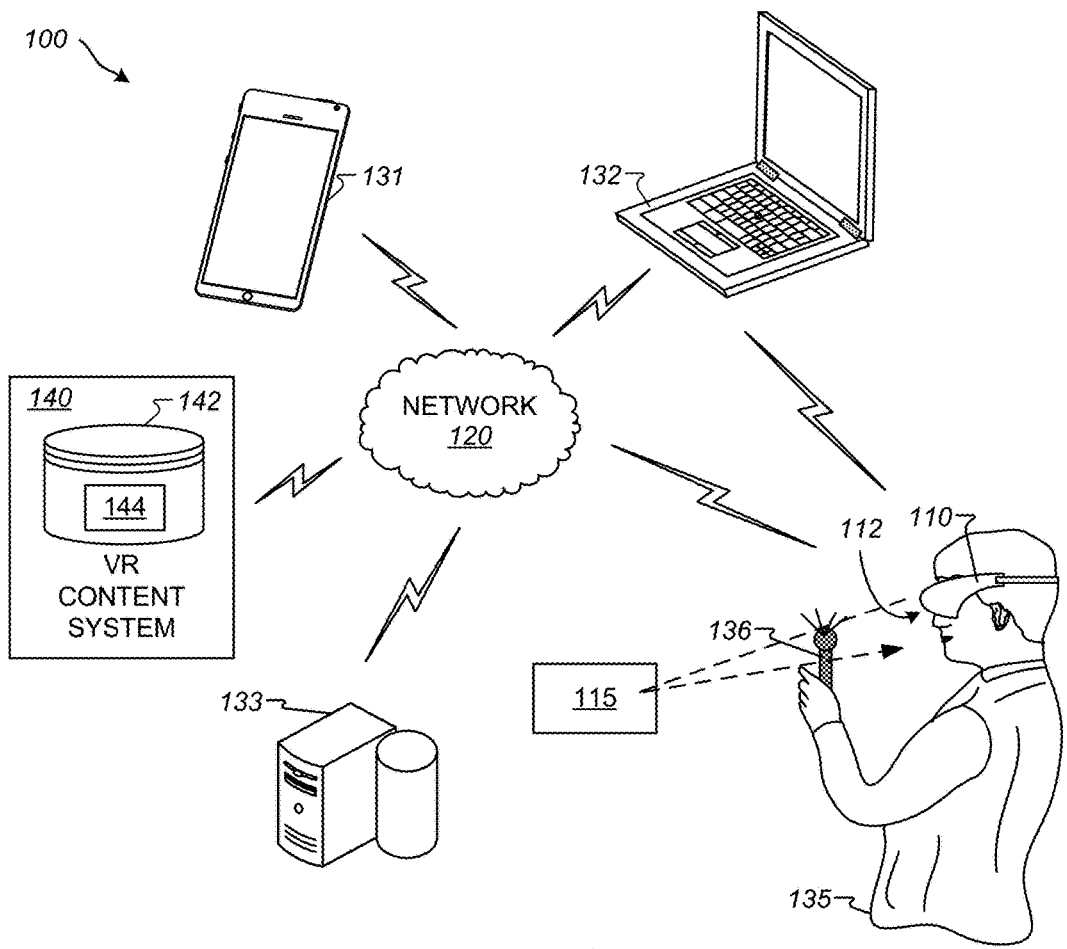
FIG. 1 is a schematic illustration of an example virtual-reality system including a head-mounted device having fewer cameras in accordance with the teachings of this disclosure.

Virtual-reality (VR) head-mounted displays or devices (V-HMDs) are next-generation computing platforms for providing virtual reality systems and/or environments. A V-HMD can include multiple sub-systems, such as a display sub-system, a camera sub-system, an image processing sub-system, a controller sub-system, etc. There is need for camera and image processing sub-systems that can perform, among other things, a plurality of VR functions that can meet customer, user, and/or wearer expectations for VR functionality. Example VR functions include, but are not limited to, 6 degree-of-freedom (6DoF) head tracking, finger/hand tracking, environmental (or depth) sensing, pass-through of images for display via or in the V-HMD, tracking a VR controller or other device held by a user, etc. Current V-HMDs designs require dedicated camera(s) for each VR function being implemented. For example, $1^{st}$ and $2^{nd}$ cameras for head tracking, $3^{rd}$ and $4^{th}$ cameras for finger/hand tracking, $5^{th}$ camera for environmental sensing (e.g., depth), $6^{th}$ and $7^{th}$ cameras for pass-through, and $8^{th}$ and $9^{th}$ cameras for tracking a VR controller, etc. Thus, current V-HMDs can require nine or more cameras to provide this basic set of VR functions. The fact that conventional V-HMDs need so many cameras, presents numerous and significant disadvantages to overcome, especially given a large number of V-HMDs may be retail devices where looks, size, industrial design, weight, etc. are important. For example, weight increase, size increase, cost increase, number of components increase, decreased reliability, increased complexity, industrial design limitations, etc. These cameras typically differ from other cameras of a V-HMD in, for example, size, angle of view, resolution, etc. Future needs for additional VR functions further compounds these issues. Limiting the number of cameras correspondingly reduces the number of VR functions that can be realized, thus, making such a VR-HMD less attractive in the marketplace. All said, there are significant hurdles in conventional V-HMDs that must be overcome to meet the needs in the market, which cannot be met by conventional V-HMDs. The fact that V-HMDs being able to support such a large number of VR functions is a testament to a significant unmet need.

Example V-HMDs that overcome at least these problems are disclosed herein. The disclosed examples require fewer cameras, two (2) versus nine (9), while still providing at least the same set of VR functions delineated above. The cameras, and the imaging sensors therein, are designed to perform a wide-range of imaging capabilities using fewer cameras. An example camera can be designed to, for example, perform a set of camera capabilities consisting of, for example, a wide field-of-view, a maximum and/or minimum sampling rate, a needed pixel arrangement, etc. to realize the desired set of VR functions to be realized. For instance, an example output of an example wide-angle capable imaging sensor as disclosed herein can be cropped to form a moderate, a normal, a narrow, etc. field-of-view image. Thus, a wide angle camera in accordance with the teachings of this disclosure can be used to capture data needed to simultaneously and/or sequentially realize a narrow, a normal and/or a wide field-of-view. Because the super-set of capabilities addresses or provides each VR functions, cost, complexity, weight, etc. of using the conventional V-HMD to implements a large number of VR functions. Realizing support for a larger number of VR functions using only a pair of stereoscopic cameras provides a significant new advantage that can be brought to bear in the V-HMD marketplace. For example, an imaging sensor and its associated camera could be designed to support a wide angle of view that can support the needed angle-of-view, and be processed to extract (cropped) to get image data for a normal angle-of-view. That is, the camera(s) can be viewed as being able to support the requirements of the two or more VR functions. In general, a camera or its imaging sensor has be designed such that all of the data needed for all supported VR function can be obtained by processing the image data in a respective or corresponding manner. As disclosed herein, a plurality of VR functions can be realized using only a pair of cameras, which is about a 75% decrease in the required number of cameras. It is contemplated that other past, present or future functions may also be supported by the two camera configuration disclosed herein.

Reference will now be made in detail to non-limiting examples of this disclosure, examples of which are illustrated in the accompanying drawings. The examples are described below by referring to the drawings, wherein like reference numerals refer to like elements. When like reference numerals are shown, corresponding description(s) are not repeated and the interested reader is referred to the previously discussed figure(s) for a description of the like element(s). These examples and variants and portions thereof shown in the attached drawings are not drawn to scale, with specific shapes, or with specific relative dimensions as they are not important to this disclosure and may render the drawings more difficult to comprehend. Specific elements may have been intentionally exaggerated for discussion purposes. Instead, the drawings have been drawn for clarity and comprehension. Further, the arrangement of elements and couplings maybe changed, rearranged, etc. according to other implementations of this disclosure and the claims herein.

Figure 2:
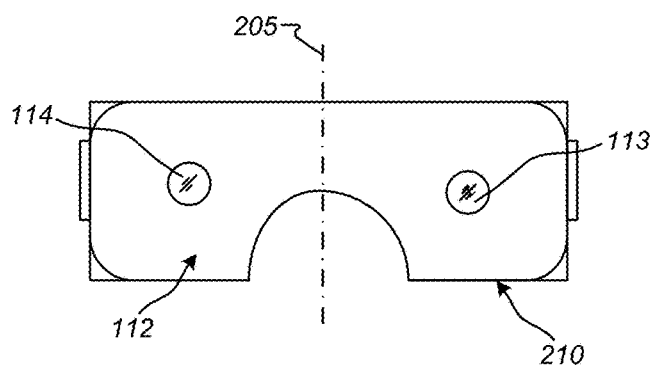
FIG. 2 is an example front view of the disclosed example virtual-reality head-mounted display of FIG. 1 in accordance with the teachings of this disclosure.
Figure 3:
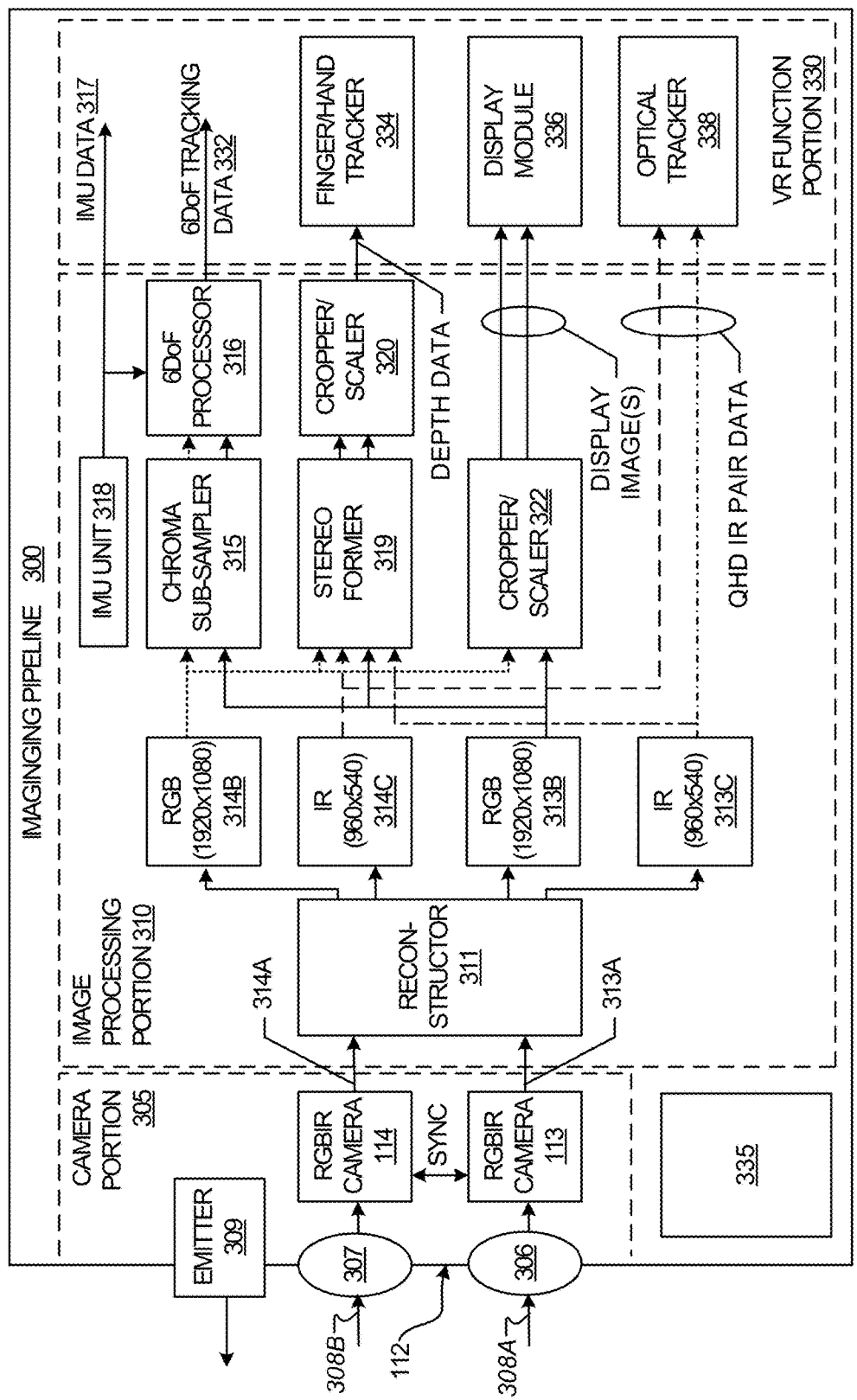
FIG. 3 is a schematic diagram of an example virtual-reality head-mounted display having fewer cameras in accordance with the teachings of this disclosure.

Turning to FIG. 1, a block diagram of an example VR system 100 is shown. The example VR system 100 includes a V-HMD 110 having a front face 112 in accordance with the teachings of this disclosure are shown. As shown in FIGS. 2 and 3, only a pair of cameras 113 and 114 is needed at the front face 112. The cameras 113 and 114 can be matched and separated by about the same distance as a person's eyes so that, if a pair of pictures is taken the pictures can provide collectively a stereoscopic impression. For example, in FIG. 2, the cameras 113 and 114 face upward from the page, and face leftward in the example of FIG. 3. The cameras 113 and 114 can capture a portion of the light moving toward or impinging the face 112. The light can move toward the face 112 along different paths or trajectories. The position(s) of the cameras 113 and 114 may vary based on any number and/or type(s) of design parameters. For example, the space between the cameras 113 and 114 can impact perceived depth of field. They may also be selected based on a desired V-HMD 110 size, industrial design, use of additional cameras, anticipated size of wearer, additional VR functions or features included, etc. Additional and/or alternative cameras can be included and/or used as an upgrade, to e.g., support additional VR functions that we not previously contemplated. For example, a fish eye lense could not have been originally included, but could later be installed to support newly contemplated VR functions. Further, one or more of the cameras 113 and 114 may be selectively controllable to image different locations at different times. Further still, the cameras 113 and 114 need not be the same. Moreover, a camera 113, 114 may be, e.g., updated by a user or service center to support additional V-HMD functions, and/or to modify or customize functionality of a V-HMD. As will be discussed more thoroughly below, a user 135 can have a VR controller 136. The VR controller 136 can, e.g., emit and/or reflect infrared (IR) or any other type(s) of light that can be detected by one or more of the cameras 113 and 114 to help determine positions of, for example, the user's hands. Likewise, other elements 115 in the VR system 100 can emit and/or reflect IR or other type(s) of light for tracking or other VR purposes.

In general, the example VR system 100 provides a VR environment and VR content that can be accessed, viewed, and/or otherwise interacted with. As will be described below in connection with FIG. 3, using only two of the disclosed example cameras 113 and 114, the example V-HMD 110 can facilitate the implementation of multiple VR functions rather than having to implement an impractical larger number of cameras, as is required in conventional V-HMDs (e.g., see a discussed above)

As shown in FIG. 1, the example VR system 100 includes a plurality of computing and/or electronic devices that can exchange data over a network 120. The devices may represent clients or servers, and can communicate via the network 120 or any other additional and/or alternative network(s). Example client devices include, but are not limited to, a mobile device 131 (e.g., a smartphone, a personal digital assistant, a portable media player, etc.), an electronic tablet, a laptop or netbook 132, a camera, the V-HMD 110, a desktop computer 133, a gaming device, and any other electronic or computing devices that can communicate using the network 120 or other network(s) with other computing or electronic devices or systems, or that may be used to access VR content or operate within a VR environment. The devices 110 and 131-133 may represent client devices. In some examples, the devices 110 and 131-133 include one or more processors and one or more memory devices, which can execute a client operating system and one or more client applications that can access, control, and light-emitting portion VR content on a light-emitting portion device implemented together with each respective device. One or more of the devices 110 and 131-133 can, e.g., emit or reflect infrared (IR) or other type(s) of light that can be detected by one or more of the cameras 113 and 114 to help determine position of a user or the devices 110, 131-133 for tracking or other VR functions.

An example stereoscopic placement of the cameras 113 and 114 is shown in FIG. 2. In the example of FIG. 2, the cameras 113 and 114 are equally spaced from opposite sides of a virtual dividing line 205, and are positioned the same different from the bottom 210 of the face 112. Other camera configurations reflecting other and/or alternative implementation objectives and/or desired VR functions are contemplated.

Turning now to FIG. 3, a schematic diagram of an example imaging pipeline 300 that may be used with any of the example V-HMDs disclosed herein shown. As discussed below, the imaging pipeline 300 can be used to carry out other non-imaging function(s) 335. The imaging pipeline 300 includes a camera portion 305 that includes the cameras 113 and 114, an image processing portion 310 that forms the necessary images for VR tracking functions, and possibly in some instances, other portion(s) 335 that can perform other imaging function(s) and/or non-imaging function(s). FIG. 3 shows the logical arrangements of elements, blocks, functions, etc. For clarity of illustration and ease of comprehension, details such as busses, memory, caches, etc. are omitted, but inclusion and implementation of such details are well known to those of skill in the art.

The example camera portion 305 of FIG. 1 includes the cameras 113 and 114 together with respective lenses 306 and 307. In the orientation of FIG. 3, light 308A and 308B moving from left to right, passes through the lenses 306, 307, possibly with optical effects performed by the lenses 306, 307, and impinges on the RGBIR imaging sensors of the cameras 113, 114. Lenses such as 306 and 307 may be fixed lenses, or can have selectively variable focal lengths, selectively perform focusing, have selectively variable apertures, have selectively variable depth of field, etc. These selective functions can be perform automatically, manually, or some combination thereof.

The two cameras 113 and 114 can be identical to each other, with both having red (R) sensing pixels (one of which is designated at reference numeral 405), green (G) sensing pixels (one of which is designated at 406 reference numeral 406), blue (B) sensing pixels (one of which is designated at reference numeral 407), and infrared (IR) sensing pixels (one of which is designated at reference numeral 408). The pixels 405-408 can be arranged in a regular or semi-random pattern, such as the example pattern shown in FIG. 4. In the example of FIG. 4, some of the G sensing 406 pixels of a conventional Bayer RGB sensor are replaced with IR sensing pixels 408 in accordance with the teachings of this disclosure. Accordingly, the IR sensing pixels 408 are placed, located, etc. within, amongst, etc. the color sensing R, G and B pixels 405-407. Compared with conventional Bayer RGB sensors that can be used in digital cameras, the RGBIR sensor 400 disclosed herein can have a mixture of R, G and B pixels sensitive to red, green and blue visible light, and IR pixels sensitive to non-visible infrared light (e.g., see FIG. 4). Accordingly, the imaging sensors of the cameras 113, 114 are RGBIR sensors, and images output by the cameras are RGBIR images. That is, the RGBIR images output by the cameras 113, 114 convey red, green, blue and IR information. As shown, a 2×2 block of pixels can include 1 red pixel, 1 green pixel, 1 blue pixel and 1 IR pixel. Color and IR pixels may be arranged in other pattern(s), and/or with different ratio(s).

The R, G and B pixels 405-407 can be equipped with a per-pixel IR-cut filter so a pixel is not sensitive or responsive to IR light. Additionally or alternatively, a dual-band filter that passes only visible light and a narrow band of IR light can be placed inside the camera module such that the R, G and B pixels 405-407 will only be response to light, i.e., an IR-cut filter per pixel. With this arrangement, IR sensing pixels only sense narrowband IR light, and the R, G and B pixels 405-407 only sense R, G and B visible light. This way the color image produced by the R, G and B sensing pixels 405-407 would be improved compared to no per-pixel IR cut filter on top of the R, G and B sensing pixels 405-407 because no IR light is leaked into those R, G and B sensing pixels 405-407.

In some instances, the camera portion 305 includes an IR emitter 309. The example IR emitter 309 can be selectively operated or activated to emit IR light that can reflect off objects such as the example objects 115 and 136 (see FIG. 1), allowing the reflected IR light to be used to locate the objects 115, 136. Additionally or alternatively, the IR emitter 309 may be implemented separately from the V-HMD 110.

Turning to the example image processing portion 310 of FIG. 3, RGBIR images 313A, 314A captured by respective ones of the cameras 113, 114 are provided to a reconstructor 311. Using any number and/or type(s) of method(s), techniques(s), algorithm(s), circuit(s), etc., the reconstructor 311 can create an RBG image 313B, 314B and an IR image 313C, 314C for respective ones of RGBIR images 313A, 314A provided by the cameras 113, 114.

Figure 5:
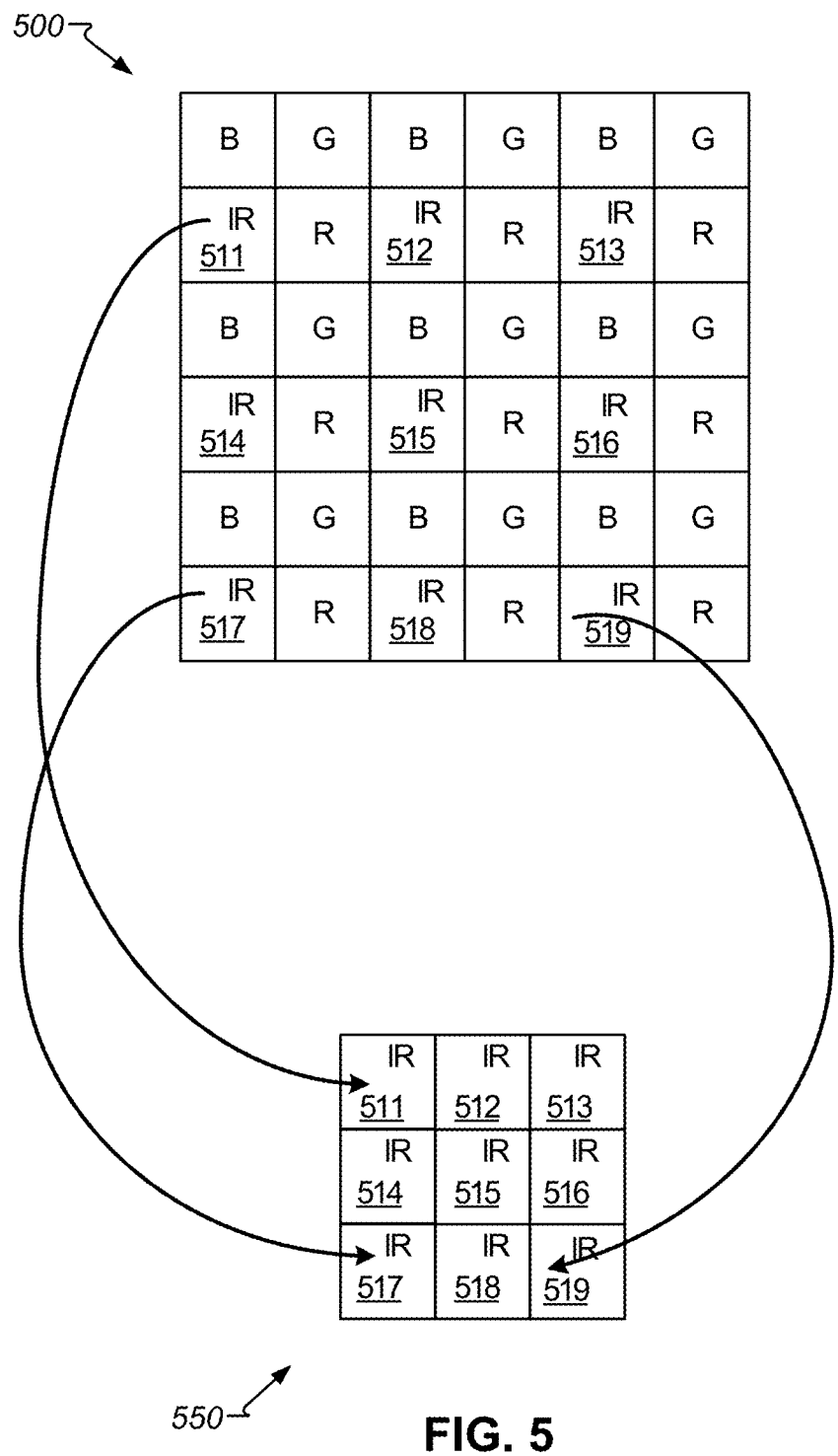
FIG. 5 is a diagram illustrating an example extraction of infrared sensing pixels.

As shown in FIG. 5, the IR images 313C and 314C in FIG. 3 can be formed by collecting the values of the IR pixels from a full RGBIR image array 500 into a smaller array 550 of just IR pixel data. Illustrated in FIG. 5 are three example movements of IR pixels 511, 517 and 519 from the image 500 into the image 550. The other IR pixels can be moved or collected in a similar manner.

The RGB images 313B and 314B may be formed by extracting or removing the IR pixels from an RGBIR image. As they are removed or extracted, the values in the array where the IR pixels were removed represent can be given a NULL, vacant, etc. value or indicator. In some examples, the IR pixels need not be so modified as they can be later overwritten by subsequent image processing. In the example of FIG. 4, the IR pixels replaced every other green pixels, however, other patterns could be used.

Using any number and/or type(s) of method(s), techniques(s), algorithm(s), circuit(s), etc., the reconstructor 311 can create an RBG image 313B, 314B and an IR image 313C, 314C for respective ones of RGBIR images 313A, 314A provided by the cameras 113, 114. Using any number and/or type(s) of method(s), techniques(s), algorithm(s), circuit(s), etc., the reconstructor 311 can create fills in the blank or vacant IR pixel locations with suitable green pixel values, thus, forming a completed RGB image 313B, 314B.

Turning now to how the four images 313B, 313C, 314B and 314C in FIG. 3 are created, formed or generation by the reconstructor 311 can be adaptive, changed, combined, etc. to perform a number of V-HMD functions and/or, more broadly, VR functions. Because of the various processing of the images 313A and 314A, the reconstructor 311 makes the images 313B, 313C, 314B and 314C that give the impression that more than two cameras were used to capture the images 313B, 313C, 314B and 314C.

The two RGB images 313B and 314B can be processed by a Chroma sub-sampler 315.

To perform 6DoF tracking, the example imaging pipeline 300 includes any number and/or type(s) of a 6DoF processor(s) 316. Using any number and/or type(s) of method(s), techniques(s), algorithm(s), circuit(s), etc., the 6DoF processor 316 can process the Chroma sub-sampled images provided by the Chroma sub-sampler 315 to track stationary and/or moving scene features in these the images provided by the Chroma sub-sampler 315. In some examples, only luminance data is used, possibly with inertial measurement data (IMD) 317 provided by an inertial measurement unit (IMU) 318. The 6DoF processor 316 provides determined 6DoF tracking data 332 the VR function portion 330 for further processing.

The example image processing portion 310 can also include a stereoscopic image former 319 and a cropper/scaler 320 to support tracking of, for example, hands and fingers. Using any number and/or type of method(s), techniques(s), algorithm(s), circuit(s), etc., the stereoscopic image former 319 combines the RGB images 313B and 314B, and the IR images 313C and 314C to form one or more stereoscopic images (e.g., three-dimensional (3D) data) of, among other things, the position and movement fingers and/or hands. This data can be provided to a finger/hand tracker 334 in the VR tracking portion 330. The IR images 313C and 314C can be formed using IR emitters and/or reflectors on the user's hand or elsewhere in a VR environment or system. Because the camera 113 and 114 can have a wider field of view (FOV) than the field of view needed to perform finger and/or hand tracking, the cropper/scaler 320 can crop the image to a smaller size and, when appropriate, can sub-sample the stereo images before tracking is performed. Such a reduction can be useful in reducing processing power and/or memory requirements.

Furthermore, the RGB images 313B and 314B can be used as pass-through images. In other words, the images 313B and 314B can be passed to the displaying module 336 of a V-HMD. The images 313B and 314B can be cropped/scaled by a cropper/scaler 322 to fit to the display resolution and/or field-of-view of the V-HMD, enabling a user to see, move and/or otherwise track themselves in a mixed virtual and real environment, and enabling augmented reality tracking in which virtual objects are laid on top of a real world scene. The pass-through images may be used for any number and/or type(s) of other functions.

The two IR images 313C and 314C can be used by an optical tracker 338 to detect IR light emitted or reflected by the VR controller such as the controller 136 so as to optically track its location. Accordingly, the IR images 313C and 314C can be passed to an optical tracker of the VR function portion 330 as a QHD IR pair stereo vision can be used to obtain depth information. To increase the robustness of stereo vision, one can add a patterned illuminator to the system such that structured light would be projected to the scene to aid stereo vision under low-light situation. This alternative implementation uses an additional component then disclosed above. Thus, there may be a tradeoff between low-light depth performance versus complexity and/or cost.

In some examples, a portion of the imager processing portion 310 of FIG. 3 related to signal processing is implemented using, for example, a programmable processor, such as the Movidius Myriad 2 Vision Processing Unit (VPU). The VR function portion 330 may be implemented using, for example, an all-in-one mobile processor, such as the Qualcomm© Snapdragon™ processor. The image processing pipeline can, additionally or alternatively, be implemented by one or more Atmel®, Intel®, AMD®, and/or ARM® microprocessors. Of course, other (micro-) processors from other processor families and/or manufacturers are also appropriate.

One or more of the elements and interfaces shown in FIGS. 1-3 may be combined, divided, re-arranged, omitted, eliminated and/or implemented in any other way. Further, one or more circuit(s), programmable processor(s), fuses, application-specific integrated circuit(s) (ASIC(s)), programmable logic device(s) (PLD(s)), field-programmable logic device(s) (FPLD(s)), and/or field-programmable gate array(s) (FPGA(s)), etc. can be used. Moreover, more interfaces and/or elements may be included instead of, or in addition to, those shown, and/or may include more than one of any or all of the illustrated interfaces and elements. The elements shown may, for example, be implemented as machine-readable instructions carried out by one or more processors. A processor, a controller and/or any other suitable processing device such as those shown in FIG. 7 may be used, configured and/or programmed to execute and/or carry out the examples disclosed herein. For example, the disclosed examples may be embodied in program code and/or machine-readable instructions stored on a tangible and/or non-transitory computer-readable medium accessible by a processor, a computer and/or other machine having a processor, such as that discussed below in connection with FIG. 7. Machine-readable instructions comprise, for example, instructions that cause a processor, a computer and/or a machine having a processor to perform one or more particular processes. Many other methods of implementing the disclosed examples may be employed. For example, the order of execution may be changed, and/or one or more of the blocks and/or interactions described may be changed, eliminated, sub-divided, or combined. Additionally, any or the entire example may be carried out sequentially and/or carried out in parallel by, for example, separate processing threads, processors, devices, discrete logic, circuits, etc.

Figure 6A:
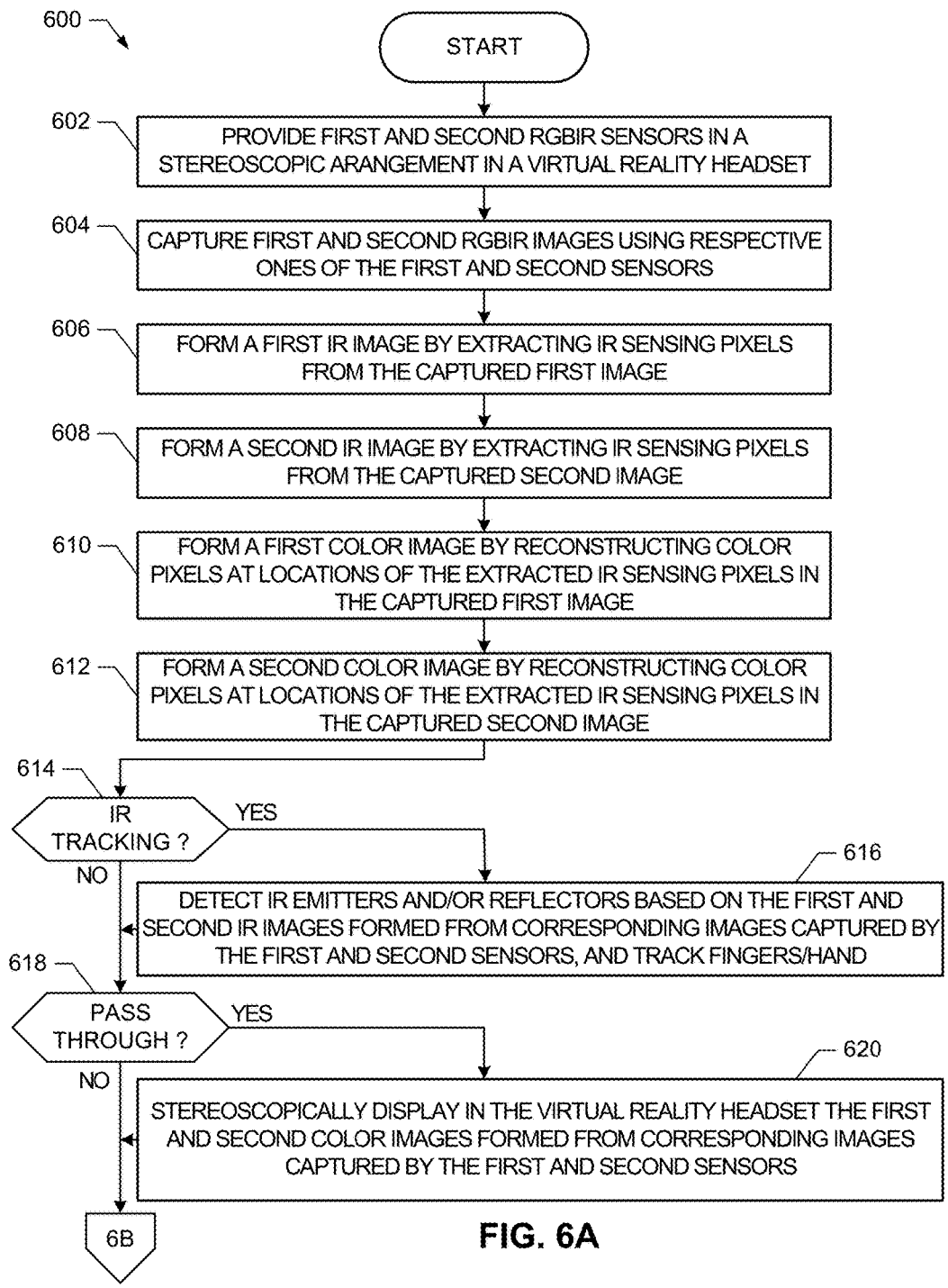
FIGS. 6A and 6B are a flowchart illustrating an example method that may, for example, be implemented using machine-readable instructions executed by one or more processors to operate the example head-mounted displays disclosed herein.
Figure 6B:
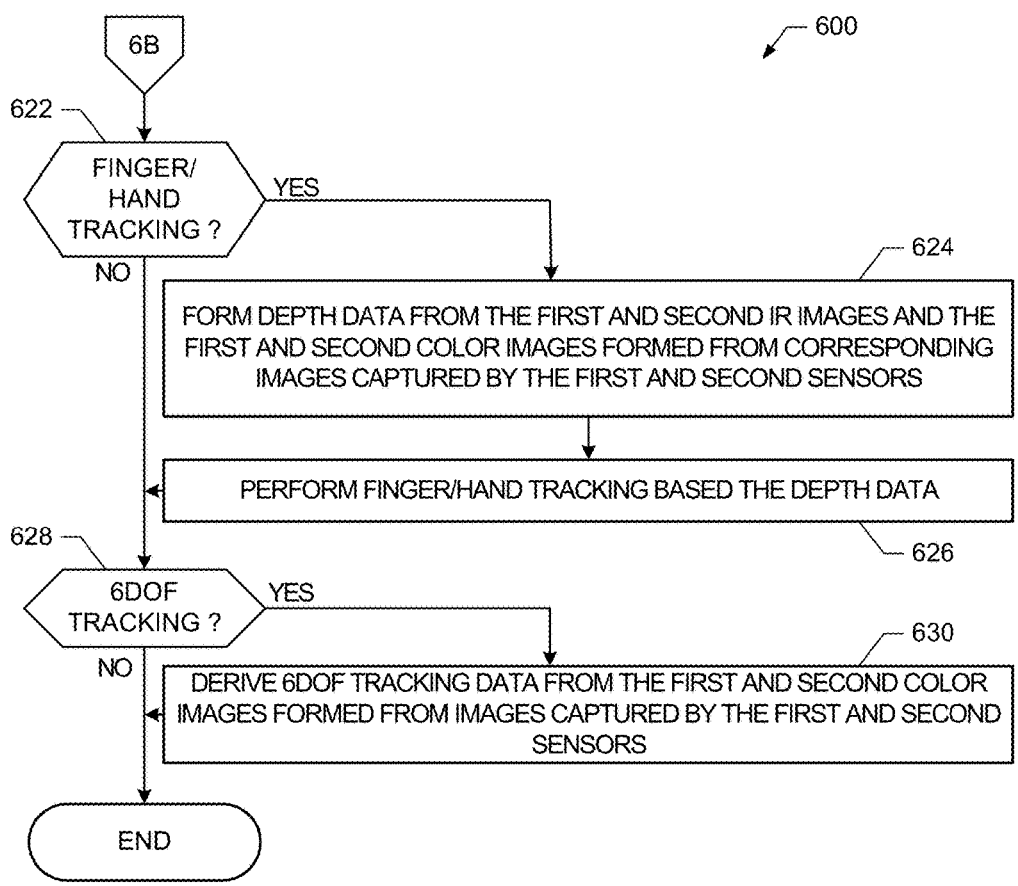

Turning collectively to FIGS. 6A and 6B, an example method 600 that may be performed to control and operate the example V-HMDs disclosed herein is shown.

The example method of FIGS. 6A and 6B begins with providing a V-HMD having first and second stereoscopically arranged RGBIR cameras (block 602), and capturing first and second RGBIR images using respective ones of the first and second RGBIR cameras (block 604). First and second IR images are formed for respective ones of the first and second RGBIR images by extracting IR pixels from respective ones of the captured first and second RGBIR images (block 606 and 608). First and second RGB images are formed by, for example, interpolating the color data to fill in the IR locations in respective ones of the RGBIR images that were extracted, removed, etc. (block 610 and 612).

If optical tracking is to be performed (block 614), the IR portion of the original first and second RGBIR images 313A and 314A can be extracted from the first and second RGBIR images, and the IR tracking data provided to the optical tracker 338 (block 616). The QHD IR pair stereo vision can be used to obtain depth information. To increase the robustness of stereo vision, a patterned illuminator can be added to the system such that structured light would be projected to the scene to aid stereo vision under low-light situation. This alternative implementation uses an additional component then disclosed above. Thus, there may be a tradeoff between low-light depth performance versus complexity and/or cost If pass through images are to be provided (block 618), the first and second RGB images 313B and 314B can be used as first and second pass-through images (block 620) The first and second images 313B and 314B can be cropped/scaled by the cropper/scaler 322 to fit to the display resolution and/or field-of-view of the V-HMD, enabling the wearer see the real world and enabling augmented reality in which virtual objects are laid on top of a real world scene. The passthrough images may be used for any number and/or type(s) of other function.

Continuing at block 622 of FIG. 6B, if IR finger/hand tracking is to be performed (block 622), the first and second IR portions of the original first and second RGBIR images 313A and 314A, and the color portions of the first and second RGBIR images, with the first and second extracted IR portions replaced with color data can be provided to the finger/hand tracker 334 (block 624). The finger/hand tracker 334 can process the image data to track finger/hand position and/or movement (block 626).

If 6DoF tracking is to be performed (block 628), the 6DoF processor(s) 316 can process Chroma sub-sampled images provided by the Chroma sub-sampler 315 to track stationary and/or moving scene features in these the first and second images provided by the Chroma sub-sampler 315 (block 630). In some examples, only luminance data is used, possibly with inertial measurement data (IMD) 317 provided by an inertial measurement unit (IMU) 318. The 6DoF processor 316 provides determined 6DoF tracking data 332 the VR function portion 330 for further processing. Control then exits from the example method of FIGS. 6A and 6B.

The example methods of FIGS. 6A and 6B, or other methods disclosed herein, may, for example, be implemented as machine-readable instructions carried out by one or more processors to control or operate the example display assemblies disclosed herein. A processor, a controller and/or any other suitable processing device may be used, configured and/or programmed to execute and/or carry out the example methods disclosed herein. For instance, the example methods of FIGS. 6A and 6B may be embodied in program code and/or machine-readable instructions stored on a tangible and/or non-transitory computer-readable medium accessible by a processor, a computer and/or other machine having a processor, such as that discussed below in connection with FIG. 7. Machine-readable instructions comprise, for example, instructions that cause a processor, a computer and/or a machine having a processor to perform one or more particular processes. Many other methods of implementing the example methods of FIGS. 6A and 6B may be employed. For example, the order of execution may be changed, and/or one or more of the blocks and/or interactions described may be changed, eliminated, sub-divided, or combined. Additionally, any of the entire example methods of FIGS. 6A and 6B may be carried out sequentially and/or carried out in parallel by, for example, separate processing threads, processors, devices, discrete logic, circuits, etc.

As used herein, the term "computer-readable medium" is expressly defined to include any type of tangible or non-transitory computer-readable medium and to expressly exclude propagating signals. Example computer-readable medium include, but are not limited to, a volatile and/or non-volatile memory, a volatile and/or non-volatile memory device, a compact disc (CD), a digital versatile disc (DVD), a read-only memory (ROM), a random-access memory (RAM), a programmable ROM (PROM), an electronically-programmable ROM (EPROM), an electronically-erasable PROM (EEPROM), an optical storage disk, an optical storage device, a magnetic storage disk, a magnetic storage device, a cache, and/or any other storage media in which information is stored for any duration (e.g., for extended time periods, permanently, brief instances, for temporarily buffering, and/or for caching of the information) and that can be accessed by a processor, a computer and/or other machine having a processor.

Returning to FIG. 1, the example network 120 may be constructed using any number and type(s) of private and/or public networks including, but not limited to, the Internet, a cellular data network, a coaxial cable network, a satellite network, a fiber optic network, a dialup or broadband modem over a telephone network, a Wi-Fi® hotspot, a private communications network (e.g., a private local area network (LAN), a wireless local area network (WLAN), a leased line), etc., and any combination thereof.

The example system 100 of FIG. 1 further includes a VR content system 140. The VR content system 140 may represent a server device. The example VR content system 140 of FIG. 1 includes any number of repositories 142 storing content and/or virtual reality applications 144 that can generate, modify, and execute VR scenes.

The example head-mounted display 110 of FIG. 1 may include, for instance, a VR headset, glasses, an eyepiece, or any other wearable device capable of light-emitting portioning VR content. In operation, the head-mounted display 110 can, for example, execute a VR application 144 to playback, present or light-emitting portion received or processed images for a user. However, images maybe played back, presented and light-emitting portioned by the head-mounted display 110 without need for a VR application 144. In some implementations, a VR application 144 of the head-mounted display 110 is hosted by one or more of the devices 131-133 shown in FIG. 1.

The one or more VR applications 144 of FIG. 1 can be configured to execute on any or all of the devices 110 and 131-133. The head-mounted display 110 can be communicatively coupled to one or more of the devices 110 and 131-133 to access VR content stored on or accessible via the VR content system 140. The devices 131-133 can be communicatively coupled (wired and/or wirelessly) to the head-mounted display 110, which can provide VR content for light-emitting portion on the head-mounted display 110.

The example head-mounted display 110 may be wirelessly coupled to the devices 131-133 via any combination of wireless networks and/or protocols such as, but not limited to, any of the Institute of Electrical and Electronics Engineers (IEEE®) 802.11x family of standards, Wi-Fi®, Bluetooth®, etc.

In the event the head-mounted display 110 is electrically coupled to one or more of the devices 131-133, a cable with an appropriate connector on either end for plugging into the devices 110 and 131-133 may be used. For example, the cable can include a Universal Serial Bus (USB) connector on both ends. The USB connectors can be the same USB type connector, or the USB connectors can each be a different type of USB connector. The various types of USB connectors include, but are not limited to, USB A-type connectors, USB B-type connectors, micro-USB A connectors, micro-USB B connectors, micro-USB AB connectors, USB five pin Mini-b connectors, USB four pin Mini-b connectors, USB 3.0 A-type connectors, USB 3.0 B-type connectors, USB 3.0 Micro B connectors, and USB C-type connectors.

In some implementations, the mobile device 131 executes the VR application(s) 144 and provides the content for the VR environment. In some implementations, the laptop computing device 132 executes the VR application(s) 144 and provides content from one or more content servers (e.g., the VR content server 140). In some implementations, the desktop computing device 133 executes the VR application(s) 144 and provides content from one or more content servers (e.g., the VR content server 140). The one or more content servers 140 and one or more computer-readable storage devices 142 can communicate with the mobile device 131, the laptop computing device 132, and/or the desktop computing device 133 using the network 120 to provide content for light-emitting portion in the head-mounted display 110.

Returning to FIG. 1, the example network 120 may be constructed using any number and type(s) of private and/or public networks including, but not limited to, the Internet, a cellular data network, a coaxial cable network, a dialup or broadband modem over a telephone network, a Wi-Fi® hotspot, a private communications network (e.g., a private local area network (LAN), a wireless local area network (WLAN), a leased line), etc.

The example system 100 of FIG. 1 further includes a VR content system 140. The VR content system 140 may represent a server device. The example VR content system 140 of FIG. 1 includes any number of repositories 142 storing content and/or virtual reality applications 144 that can generate, modify, and execute VR scenes.

The example V-HMD 110 of FIG. 1 may include, for instance, a V-HMD, glasses, an eyepiece, or any other wearable device capable of light-emitting portioning VR content. In operation, the V-HMD 110 can, for example, execute a VR application 144 that can playback, present or light-emitting portion received or processed images for a user. However, images maybe played back, presented and light-emitting portioned by the V-HMD 110 without need for a VR application 144. In some implementations, a VR application 144 of the V-HMD 110 is hosted by one or more of the devices 131-133 shown in FIG. 1.

The one or more VR applications 144 of FIG. 1 can be configured to execute on any or all of the devices 110 and 131-133. The V-HMD 110 can be communicatively coupled to one or more of the devices 110 and 131-133 to access VR content stored on or accessible via the VR content system 140. The devices 131-133 can be communicatively coupled (wired and/or wirelessly) to the V-HMD 110, which can provide VR content for light-emitting portion on the V-HMD 110.

In the event the V-HMD 110 is electrically coupled to one or more of the devices 131-133, a cable with an appropriate connector on either end for plugging into the devices 110 and 131-133 may be used. For example, the cable can include a Universal Serial Bus (USB) connector on both ends. The USB connectors can be the same USB type connector, or the USB connectors can each be a different type of USB connector. The various types of USB connectors include, but are not limited to, USB A-type connectors, USB B-type connectors, micro-USB A connectors, micro-USB B connectors, micro-USB AB connectors, USB five pin Mini-b connectors, USB four pin Mini-b connectors, USB 3.0 A-type connectors, USB 3.0 B-type connectors, USB 3.0 Micro B connectors, and USB C-type connectors.

In some implementations, the mobile device 131 executes the VR application(s) 144 and provides the content for the VR environment. In some implementations, the laptop computing device 132 executes the VR application(s) 144 and provides content from one or more content servers (e.g., the VR content server 140). In some implementations, the desktop computing device 133 executes the VR application(s) 144 and provides content from one or more content servers (e.g., the VR content server 140). The one or more content servers 140 and one or more computer-readable storage devices 142 can communicate with the mobile device 131, the laptop computing device 132, and/or the desktop computing device 133 using the network 120 to provide content for light-emitting portion in the V-HMD 110.

Figure 7:
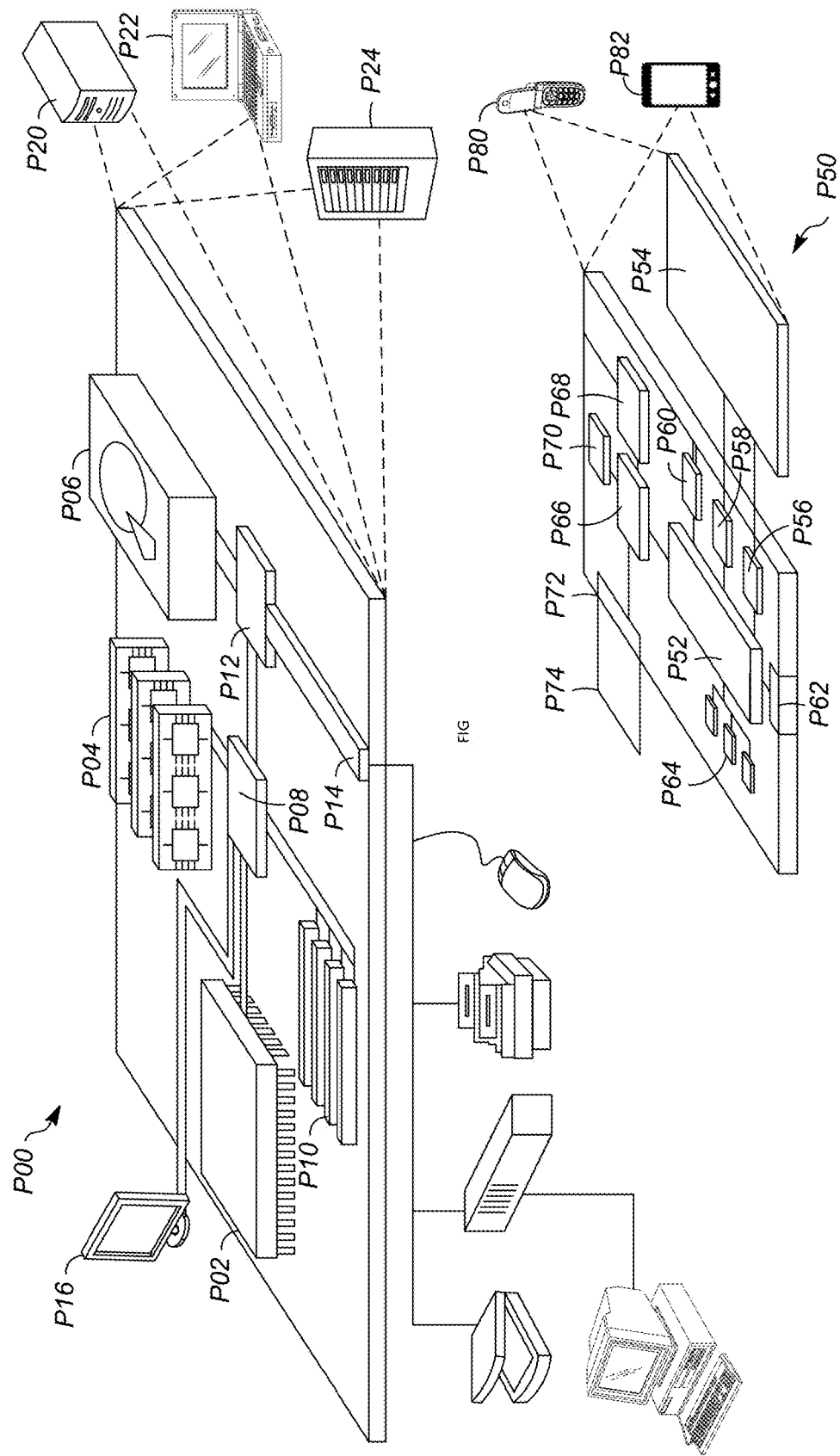
FIG. 7 is a block schematic diagram of an example computer device and an example mobile computer device that may be used to implement the examples disclosed herein.

Turning to FIG. 7, an example of a generic computer device P00 and a generic mobile computer device P50, which may be used with the techniques described here. Computing device P00 is intended to represent various forms of digital computers, such as laptops, desktops, tablets, workstations, personal digital assistants, televisions, servers, blade servers, mainframes, and other appropriate computing devices. Computing device P50 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device P00 includes a processor P02, memory P04, a storage device P06, a high-speed interface P08 connecting to memory P04 and high-speed expansion ports P10, and a low speed interface P12 connecting to low speed bus P14 and storage device P06. The processor P02 can be a semiconductor-based processor. The memory P04 can be a semiconductor-based memory. Each of the components P02, P04, P06, P08, P10, and P12, are interconnected using various busses, connections, memories, caches, etc. and may be mounted on a common motherboard or in other manners as appropriate. The processor P02 can process instructions for execution within the computing device P00, including instructions stored in the memory P04 or on the storage device P06 to light-emitting portion graphical information for a GUI on an external input/output device, such as light-emitting portion P16 coupled to high speed interface P08. In other implementations, multiple processors and/or multiple buses may be used, as appropriate, along with multiple memories and types of memory. Also, multiple computing devices P00 may be connected, with each device providing portions of the necessary operations (e.g., as a server bank, a group of blade servers, or a multi-processor system).

The memory P04 stores information within the computing device P00. In one implementation, the memory P04 is a volatile memory unit or units. In another implementation, the memory P04 is a non-volatile memory unit or units. The memory P04 may also be another form of computer-readable medium, such as a magnetic or optical disk.

The storage device P06 is capable of providing mass storage for the computing device P00. In one implementation, the storage device P06 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory P04, the storage device P06, or memory on processor P02.

The high speed controller P08 manages bandwidth-intensive operations for the computing device P00, while the low speed controller P12 manages lower bandwidth-intensive operations. Such allocation of functions is exemplary only. In one implementation, the high-speed controller P08 is coupled to memory P04, light-emitting portion P16 (e.g., through a graphics processor or accelerator), and to high-speed expansion ports P10, which may accept various expansion cards (not shown). In the implementation, low-speed controller P12 is coupled to storage device P06 and low-speed expansion port P14. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device P00 may be implemented in a number of different forms, as shown in the figure. For example, it may be implemented as a standard server P20, or multiple times in a group of such servers. It may also be implemented as part of a rack server system P24. In addition, it may be implemented in a personal computer such as a laptop computer P22. Alternatively, components from computing device P00 may be combined with other components in a mobile device (not shown), such as device P50. Each of such devices may contain one or more of computing device P00, P50, and an entire system may be made up of multiple computing devices P00, P50 communicating with each other.

Computing device P50 includes a processor P52, memory P64, an input/output device such as a light-emitting portion P54, a communication interface P66, and a transceiver P68, among other components. The device P50 may also be provided with a storage device, such as a microdrive or other device, to provide additional storage. Each of the components P50, P52, P64, P54, P66, and P68, are interconnected using various buses, and several of the components may be mounted on a common motherboard or in other manners as appropriate.

The processor P52 can execute instructions within the computing device P50, including instructions stored in the memory P64. The processor may be implemented as a chipset of chips that include separate and multiple analog and digital processors. The processor may provide, for example, for coordination of the other components of the device P50, such as control of user interfaces, applications run by device P50, and wireless communication by device P50.

Processor P52 may communicate with a user through control interface P58 and light-emitting portion interface P56 coupled to a light-emitting portion P54. The light-emitting portion P54 may be, for example, a TFT LCD (Thin-Film-Transistor Liquid Crystal Light-emitting portion) or an OLED (Organic Light-emitting Diode) light-emitting portion, or other appropriate light-emitting portion technology. The light-emitting portion interface P56 may comprise appropriate circuitry for driving the light-emitting portion P54 to present graphical and other information to a user. The control interface P58 may receive commands from a user and convert them for submission to the processor P52. In addition, an external interface P62 may be provided in communication with processor P52, so as to enable near area communication of device P50 with other devices. External interface P62 may provide, for example, for wired communication in some implementations, or for wireless communication in other implementations, and multiple interfaces may also be used.

The memory P64 stores information within the computing device P50. The memory P64 can be implemented as one or more of a computer-readable medium or media, a volatile memory unit or units, or a non-volatile memory unit or units. Expansion memory P74 may also be provided and connected to device P50 through expansion interface P72, which may include, for example, a SIMM (Single Inline Memory Module) card interface. Such expansion memory P74 may provide extra storage space for device P50, or may also store applications or other information for device P50. Specifically, expansion memory P74 may include instructions to carry out or supplement the processes described above, and may include secure information also. Thus, for example, expansion memory P74 may be provide as a security module for device P50, and may be programmed with instructions that permit secure use of device P50. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer or machine-readable medium, such as the memory P64, expansion memory P74, or memory on processor P5 that may be received, for example, over transceiver P68 or external interface P62.

Device P50 may communicate wirelessly through communication interface P66, which may include digital signal processing circuitry where necessary. Communication interface P66 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver P68. In addition, short-range communication may occur, such as using a Bluetooth, Wi-Fi, or other such transceiver (not shown). In addition, GPS (Global Positioning System) receiver module P70 may provide additional navigation- and location-related wireless data to device P50, which may be used as appropriate by applications running on device P50.

Device P50 may also communicate audibly using audio codec P60, which may receive spoken information from a user and convert it to usable digital information. Audio codec P60 may likewise generate audible sound for a user, such as through a speaker, e.g., in a handset of device P50. Such sound may include sound from voice telephone calls, may include recorded sound (e.g., voice messages, music files, etc.) and may also include sound generated by applications operating on device P50.

The computing device P50 may be implemented in a number of different forms, as shown in the figure. For example, it may be implemented as a cellular telephone P80. It may also be implemented as part of a smart phone P82, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a light-emitting portion device (e.g., a CRT (cathode ray tube) or LCD (liquid crystal light-emitting portion) monitor) for light-emitting portioning information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Relative terms, such as lessor, fewer, less than, reduced, greater, higher, increased, etc., can represent that the disclosed examples can be implemented with fewer cameras than conventional solutions. V-HMDs constructed in accordance with this disclosure need not provide or specify a particular decrease in the number of cameras, given both cameras can realize the same functionality and/or capability. As such, it is not necessary to achieve for a particular and/or specific improvement(s) by reducing the needed cameras and, thus, need not, and will not, be specified herein. Further, terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Moreover, use of terms such as up, down, top, bottom, side, end, front, back, etc. herein are used with reference to a currently considered or illustrated orientation. If they are considered with respect to another orientation, it should be understood that such terms must be correspondingly modified.

Further, in this specification and the appended claims, the singular forms "a," "an" and "the" do not exclude the plural reference unless the context clearly dictates otherwise. Moreover, conjunctions such as "and," "or," and "and/or" are inclusive unless the context clearly dictates otherwise. For example, "A and/or B" includes A alone, B alone, and A with B.

Additionally, connecting lines and connectors shown in the various figures presented are intended to represent exemplary functional relationships and/or physical or logical couplings between the various elements. It should be noted that many alternative and/or additional functional relationships, physical connections or logical connections may be present. Moreover, no item or component is essential to the practice of this disclosure unless the element is specifically described as "essential" or "critical". Additionally, the figures and/or drawings are not drawn to scale, but rather are drawn for clarity of illustration and description.

Although certain example methods, apparatuses and articles of manufacture have been described herein, the scope of coverage of this patent is not limited thereto. It is to be understood that terminology employed herein is for the purpose of describing particular aspects, and is not intended to be limiting. On the contrary, this patent covers all methods, apparatus and articles of manufacture fairly falling within the scope of the claims of this patent.

What is claimed is:

1. A method comprising:
    providing a virtual-reality (VR) head-mounted display (V-HMD) having an imaging sensor, the imaging sensor including color-sensing pixels, and infrared (IR)-sensing pixels amongst the color-sensing pixels;
    capturing, using the imaging sensor, an image having a color portion and an IR portion;
    forming an IR image and a color image from the captured image by:
        forming the IR image from at least some of the IR portion from the captured image;
        forming the color image by replacing the IR portion of the captured image with color data determined from the color portion of the captured image and locations of the IR-sensing pixels in the imaging sensor;
    performing a first tracking based on the IR image;
    performing a second tracking based on the color image; and
    performing hand tracking based on the IR image and the color image.

2. The method of claim 1, further comprising:
    performing a third tracking based on the IR image; and
    performing a fourth tracking based on the color image.

3. The method of claim 1, wherein the second tracking includes six degrees of freedom tracking.

4. The method of claim 3, wherein the third tracking includes IR optical tracking of a VR controller.

5. The method of claim 1, further comprising providing the color image for display in the V-HMD.

6. The method of claim 5, further comprising at least one of a cropping or scaling the color image before the color image is displayed in the V-HMD.

7. The method of claim 1, wherein at least two of the image, the color image, and the IR image differ in at least one of a size, a dimension, a sampling rate, or a resolution.

8. The method of claim 1, wherein the IR-sensing pixels being amongst color-sensing pixels comprises at least one of:
   the IR-sensing pixels being at least partially encircled by at least some of the color-sensing pixels; and
   the color-sensing and IR-sensing pixels forming a regular pattern.

9. A virtual-reality (VR) head-mounted device (V-HMD) for use in a VR environment, the V-HMD comprising:
   an imaging sensor to capture an image using color-sensing pixels, and infrared (IR)-sensing pixels located amongst the color-sensing pixels, the captured image having a color portion and an IR portion;
   a reconstructor configured to remove at least some of the IR portion from the image, and form an IR image from the removed IR portion;
   a first tracker configured to perform first VR tracking within the VR environment using the IR image;
   an image modifier to form a color image by replacing the removed IR portion with color pixels determined based on the color portion of the image and locations of the removed IR-sensing pixels in the image;
   a second tracker configured to perform a second VR tracking based on the color image; and
   a hand tracker configured to perform hand tracking based on the IR image and the color image.

10. The V-HMD of claim 9, wherein IR-sensing pixels replace at least some green sensing pixels of the color-sensing pixels.

11. The V-HMD of claim 9, wherein at least two of the image, the color image, and the IR image differ in at least one of a size, a dimension, a pixel density, or a resolution.

12. The V-HMD of claim 9, wherein the IR-sensing pixels and the color-sensing pixels of the imaging sensor are arranged in a regular pattern such that each 2×2 block of pixels in the imaging sensor includes three color-sensing pixels and one IR-sensing pixel.

13. The V-HMD of claim 12, wherein the three color-sensing pixels of each 2×2 block of pixels in the imaging sensor include a red-sensing pixel, a blue-sensing pixel, and a green-sensing pixel.

14. The V-HMD of claim 9, further comprising a dual-band filter that passes only visible light and a narrow band of IR light disposed inside the V-HMD such that the imaging sensor is exposed to only the visible light and the narrow band of IR light that passes through the dual-band filter.

15. The V-HMD of claim 9, wherein the second tracking includes a six degrees of freedom tracking.

16. The V-HMD of claim 15, wherein the six degrees of freedom tracking is based on a chroma sub-sampled image generated from the color image.

17. A system comprising:
   a virtual-reality (VR) head-mounted device (V-HMD) including:
      a first imaging sensor configured to capture a first image having a color portion captured by color-sensing pixels of the first imaging sensor and an infrared (IR) portion captured by IR-sensing pixels of the first imaging sensor; and
      a second imaging sensor configured to capture a second image having a color portion captured by color-sensing pixels of the second imaging sensor and an IR portion captured by IR-sensing pixels of the second imaging sensor;
   at least one memory including instructions; and
   at least one processor that is operably coupled to the at least one memory and that is arranged and configured to execute instructions that, when executed, cause the system to:
      form a first IR image using the IR portion of the first image;
      form a second IR image using the IR portion of the second image;
      perform an optical tracking based on at least one of the first IR image or the second IR image;
      form a first color image by replacing the IR portion of the first image with color data determined based on the color portion of the first image and a location the IR portion of the first image;
      form a second color image by replacing the IR portion of the second image with color data determined based on the color portion of the second image and a location of the IR portion of the second image;
      perform a six degrees of freedom tracking based on one or more of the first color image and the second color image; and
      perform a hand tracking based on a stereoscopic image formed from the first IR image, the second IR image, the first color image, and the second color image.

18. The system of claim 17, wherein instructions, when executed, cause the system to additionally provide at least one of the first color image or the second color image for display in the V-HMD.

19. The system of claim 17, wherein the IR-sensing pixels and the color-sensing pixels of the first imaging sensor are arranged in a regular pattern such that each 2×2 block of pixels in the first imaging sensor includes three color-sensing pixels and one IR-sensing pixel.

20. The system of claim 19, wherein the three color-sensing pixels of each 2×2 block of pixels in the first imaging sensor include a red-sensing pixel, a blue-sensing pixel, and a green-sensing pixel.

* * * * *

UNITED STATES PATENT AND TRADEMARK OFFICE
CERTIFICATE OF CORRECTION

PATENT NO. : 10,114,465 B2
APPLICATION NO. : 14/996858
DATED : October 30, 2018
INVENTOR(S) : Wan et al.

It is certified that error appears in the above-identified patent and that said Letters Patent is hereby corrected as shown below:

In the Claims

In Column 16, Claim 6, Line 63, delete "of a" and insert -- of --, therefor.

In Column 17, Claim 9, Line 11, delete "pixels," and insert -- pixels --, therefor.

Signed and Sealed this
Second Day of April, 2019

Andrei Iancu
*Director of the United States Patent and Trademark Office*